United States Patent [19]

Cacace

[11] Patent Number: 5,124,214
[45] Date of Patent: Jun. 23, 1992

[54] RECYCLING SCRAP METAL

[75] Inventor: Antonino G. Cacace, Swansea, United Kingdom

[73] Assignee: Camborne Industries PLC, Neath, United Kingdom

[21] Appl. No.: 586,543

[22] Filed: Sep. 21, 1990

[51] Int. Cl.$^5$ .................. B32B 1/06; B32B 15/16
[52] U.S. Cl. .................. 428/577; 428/558; 428/590; 428/685
[58] Field of Search ............ 428/558, 588, 589, 590, 428/614, 685, 577; 419/8, 9, 28; 148/11.5 Q

[56] References Cited

U.S. PATENT DOCUMENTS

| 316,209 | 4/1885 | Westerman | 428/588 |
|---|---|---|---|
| 359,337 | 3/1887 | Wheeler | 428/588 |
| 361,197 | 4/1887 | Wheeler | 428/590 |
| 510,763 | 12/1893 | Baugh | 428/590 |
| 520,487 | 5/1894 | Moore | 428/590 |
| 1,354,492 | 10/1920 | Jones | 419/28 |
| 1,742,111 | 12/1929 | Weishan | 428/588 |
| 2,333,271 | 11/1943 | Paterson | 419/69 |
| 2,756,492 | 7/1956 | Pettibone | 425/558 |
| 3,892,030 | 7/1975 | De Pierre et al. | 29/420 |
| 3,899,821 | 8/1975 | Ito et al. | 419/28 |
| 4,131,461 | 12/1978 | De Pierre et al. | 428/558 |
| 4,699,657 | 10/1987 | DiGiambattista | 419/28 |
| 4,966,818 | 10/1990 | Johansson et al. | 428/558 |

FOREIGN PATENT DOCUMENTS

| 1313545 | 4/1973 | United Kingdom | 419/8 |
|---|---|---|---|
| 2151261 | 7/1985 | United Kingdom . | |

*Primary Examiner*—John Zimmerman
*Attorney, Agent, or Firm*—Young & Thompson

[57] ABSTRACT

A billet is provided for subsequent heating and working into a finished product in, for example, a rolling mill. The billet comprises a mass of swarf jacketed in a tubular jacket. At least one end of the jacket is joined to an end piece which surrounds the end of the mass of swarf. The end piece and the jacket are materials of different composition. In particular, a jacket of stainless steel with mild steel end pieces at each end is envisaged. The end pieces may be open ended sleeves or caps. Where an open ended sleeve is used it may be closed by crimping its end or by the provision of an insert which is welded or crimped into the sleeve. The end of the swarf exposed in the sleeve may also be sealed by application of a graphite paste.

8 Claims, 2 Drawing Sheets

RECYCLING SCRAP METAL

FIELD OF THE INVENTION

This invention relates to the recycling of scrap metal. It has particular application to recycling by rolling or otherwise hot-working a billet made up of scrap metal swarf compacted in a tubular jacket.

The term "swarf" comprehends the off cuts from machining operations in general and is intended to include the off cuts from turning, boring, shaping and milling operations on engineering steels. The fine off cuts from some stamping and punching operations may also be suitable. The term "engineering steel" is intended to describe those low alloy steels which are commonly subjected to machining operations including mild steel (a term which itself includes carbon steel), forging steel and axle or shaft steel all of which contain significant amounts of carbon.

DESCRIPTION OF PRIOR ART

In British patent #1313545 there is disclosed, inter alia, a process in which steel swarf is pressed into compact masses (which for convenience will be called "briquettes"). The briquettes are pressed together and jacketed in a closed tube, usually of steel or stainless steel. The billet so formed is then heated and worked by a process such as rolling into a finished or semi-finished product.

The forming of the briquettes may take place in a cavity die prior to being jacketed. Alternatively briquettes may be formed directly in the bore of the tube. In this case the tube is inserted in a supporting die during the compaction process and the bore of the tube serves as the cavity. In either case the compaction is carried out by means of a press having a ram which presses a quantity of the swarf previously inserted in the cavity into a briquette. The ram is then withdrawn and a new charge of swarf is inserted in the cavity. The ram is again inserted in the cavity to form a new briquette pressed up against the earlier formed briquette. The cycle is repeated until the cavity is substantially filled up with briquettes.

During the heating the oxides on the swarf inside the jacketing tube are reduced and during the working process the metal particles of which the briquettes are composed are consolidated into a unitary mass which are sintered to each other and to the jacket.

The reduction of oxides on the swarf occurs as a result of the combination thereof with carbon which is either introduced into the jacket or which diffuses out of the steel or other metal of which the swarf is composed. The jacketing tube serves to maintain reducing conditions within the billet. Attempts to produce an acceptable hot worked product from a billet of unjacketed swarf have been unsuccessful even when great care was taken to try to prevent atmospheric oxygen from getting to the hot billet.

One of the commercially and technically important products of the process is a billet comprised of a stainless steel jacket filled with briquettes of mild steel or carbon steel which can be worked into a finished product having the desirable properties and low cost of engineering steel but which has a stainless steel cladding.

A product comprising a core of steel clad with a non-ferrous metal such as copper also has commercial potential.

Billets comprising stainless steel tubes filled with compacted swarf have heretofore presented special problems which are discussed later in this specification and it is an object of the invention to address these problems.

SUMMARY OF THE INVENTION

According to the invention there is provided a billet of recycling swarf including the steps of making up a billet comprising a mass of the swarf jacketed in a tubular jacket, characterised in that at least one end of the jacket is joined to an end piece which surrounds an end portion of the mass of swarf, the end piece and the jacket being of metals of different composition.

In many cases in practice end pieces will be provided on both ends of the jacket.

In one aspect of the invention the jacket is of stainless steel. In another aspect of the invention the end piece is of engineering steel.

In one form of the invention the end piece is in the form of an open ended sleeve. Alternatively the end piece may be in the form of a cap.

In another aspect of the invention a sealing member is provided which is inserted in the sleeve and which overlies the said one end of the mass of swarf.

The invention has particular application to swarf composed substantially of engineering steel.

Further according to the invention the billet is heated and hot worked into a product in which the swarf and the jacket are bonded together and from which the end piece is removed.

A number of advantages have been found to arise from the provision of the end pieces. In the first place there is a substantial difference in the coefficient of expansion between engineering steels and stainless steels. Thus, after a billet comprising a core of mild steel swarf in a stainless steel tube of 100 mm diameter is heated the diameter of the tube may be as much as 3 mm greater than that of the core. The gap between the core and a stainless steel tube without end pieces thus created would allow atmospheric oxygen into the billet and the resulting oxidation would render the billet and the finished product substantially useless. By contrast, in a similar billet with a jacketing tube having mild steel end pieces according to the invention there is no substantial difference in diameter between the core and bore of the end pieces either before or after heating. Moreover during heating the core sinters to the end pieces creating a barrier to the passage of extraneous gases into the bore of the tube.

Where the billet is to be rolled another advantage afforded by the use of mild steel end pieces is that they provide easier entry for the billet into the rolls.

Yet another advantage arising from the use of mild steel end pieces and the consequent sintering of the ends of the core to the end pieces is that any tendency of the core to be pushed out of the jacket during rolling is eliminated or at least diminished.

Still another advantage of the invention is that wastage of the stainless steel or copper material comprising the jacket is reduced. The ends of a finished product produced by any rolling operation are always defective. They are therefore cut off and discarded. Up to 8% of the jacket of a billet which is 1 meter long prior to rolling is discarded in this way. If the part of the jacket which is ultimately discarded can be at least partially replaced by a less expensive material, substantial savings on the cost of the jacketing material may be achieved.

BRIEF DESCRIPTION OF THE DRAWINGS

The invention is further discussed with reference to the accompanying drawings in which various embodiments thereof are illustrated by way of example and in which.

DETAILED DESCRIPTION OF THE EMBODIMENTS SHOWN IN THE DRAWINGS

Figure 1:
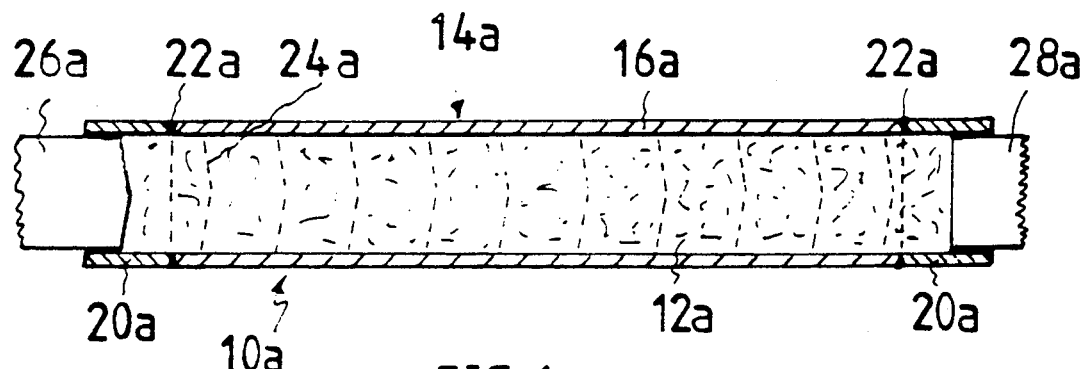
FIG. 1 is a schematic cross-sectional side view of a billet comprised of a core of briquettes of engineering steel swarf inserted in a tubular jacket.

In FIG. 1 the billet 10a comprises a body or core 12a made up of briquettes of compacted mild steel or carbon steel swarf pressed into a jacket 14a.

Prior to compaction the swarf should be cleaned and crushed as described in British patent #1313545. Swarf so treated will still have normal surface oxidation. This oxidation will be removed when the billet is heated. It may however be preferable to use swarf which, after cleaning and crushing, has been preheated and allowed to cool in reducing conditions to remove the surface oxides. This has two advantages. First, the amount of oxygen and of carbon dioxide which may be evolved in the interior of the tube will be much diminished if not eliminated. In the presence of either of these gases chrome oxides are formed on the surface of austenitic stainless steels above about 900° C. When they occur they are visible as a green layer at the interface of the core and the jacket. Once formed these oxides are not reduced. The presence of these oxides impairs the bond between the core and the stainless steel jacket.

The second advantage of prereducing and cooling the swarf is that the swarf is annealed in the process. This enables the briquettes to be compacted to a substantially greater density.

The jacket is comprised of a tube 16a of austenitic stainless steel to each end of which an open ended sleeve 20a of mild steel is butt welded, as indicated at 22a. The interfaces between the briquettes are indicated at 24a.

The core is formed substantially in the manner described in British patent #1313545. Discrete charges of the swarf are fed successively into the bore of the tube through the sleeve 22a at, say, the left hand end of the tube. A hydraulic press is used to compact each load in turn into a briquette. The press comprises a ram (indicated at 26a) which is extended into the bore of the tube from the left hand end. The first load of swarf is compacted between the ram against a stop 28a at the right hand end of the tube to form the first briquette. Each subsequent load of swarf is compacted by the ram against the last-formed briquette. Pressing of briquettes continues until the tube 16a is substantially filled up. A small space is left in the bore between the core and each end of the tube. The core should in any case project well into the sleeve 20a at each end of the tube.

The press may alternatively comprise two rams which are advanced one into each end of the tube. In this case the first briquette is formed at the longitudinal centre of the tube and charges of swarf are thereafter fed into each end of the tube so that two briquettes are formed in each subsequent cycle of the press.

For many purposes the billet 10a may now be heated and rolled without further modification. As has already been described the particles of swarf at each end of the core sinter together and to the sleeves 20a as the temperature increases. Extraneous gases, particularly atmospheric oxygen, are thus prevented from entering the interior of the tube. Moreover carbon diffuses out of the swarf and combines with residual oxygen in the tube and with the surface oxides on the swarf to form carbon monoxide and carbon dioxide. Substantially all of the surface oxides are reduced in this manner.

Rolling can be carried out by conventional techniques in a conventional rolling mill. In the process of rolling, sintering of the particles of swarf is completed and the core becomes bonded to the stainless steel jacket. The ends of the rolled product which are jacketed by the deformed sleeves 20a are cut off and discarded.

It is not entirely clear, at the present time, whether CO is oxidising to the stainless steel in the conditions in which the billets are heated and rolled. Finished products produced by many billets, even when the surface oxides have not been removed prior to jacketing, have failed to exhibit any sign of the aforementioned green layer at the interface.

It may therefore in some instances be desirable to take further steps to prevent or reduce the evolution of CO in the core and thus cut down the occurrence of chrome oxides as aforementioned. To this end compaction of the swarf in the tube may take place under an inert atmosphere such as nitrogen or hydrogen; or the interior of the tube may be evacuated prior to heating. Both of these steps remove residual oxygen from the interior of the tube so that, particularly when the surface oxides on the swarf have been reduced prior to jacketing, the occurrence of both CO and $CO_2$ may be eliminated or at least much reduced. To retain the inert gas or a vacuum inside the billet it is necessary to close the ends of the tube.

Figure 2:
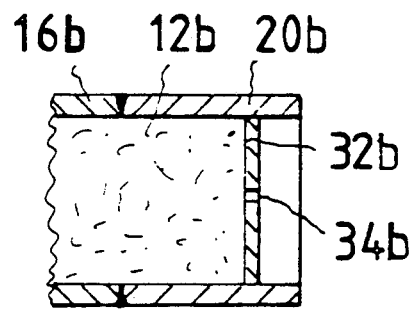
FIGS. 2, 3, 4 and 5 are cross-sectional side views each of one end of modified billets.

For example, referring to FIG. 2, prior to heating a mild steel end plate 32b is pressed into each end of the tube and up against the end face of the core 12b. The end plate may then be welded to the tube 16b.

Figure 3:
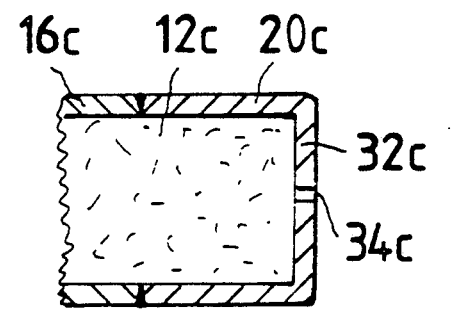
Figure 4:
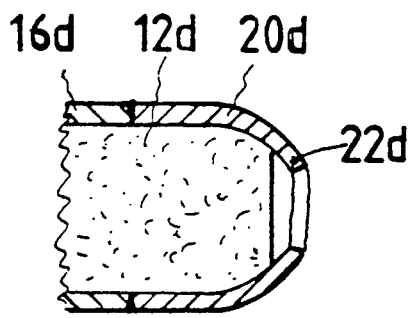
Figure 5:
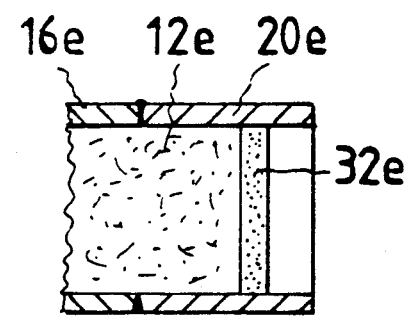

In FIG. 3 a preformed cap 20c is welded to at least one end of the jacket 16c in place of the open ended sleeve. The cap has an integrally formed roof 32c which serves the same function as the plate 32b in FIG. 2. If the billet is cold formed prior to insertion of the core 12c in the jacket end caps 20c can be welded to both ends of the jacket, the second end cap being buttwelded to the jacket 16c after the core 12c is inserted in the tube.

Where only a partial closure of the tube ends is necessary, perhaps the simplest way of sealing the tube is to crimp the ends of the sleeves closed as shown at 22d in FIG. 4. The fact that the crimped ends may not be perfectly sealed will in many cases be of little consequence and in some cases may even be essential. This is because it is necessary for any gases evolved or present in the tube during heating to be able to escape. For the same reason it may be necessary to drill small holes 34b, 34c in the plate 32b (FIG. 2) and/or in the cap 20c (FIG. 3).

Another simple way to at least partially seal the tube is to apply a paste 32e of graphite (or other suitable agent which evolves a reducing gas when heated) in water to the end faces of the core 12e. An advantage of applying graphite to the end face of the body of swarf is that, because it is exposed directly to the furnace heat, the end heats up far more quickly than the interior of the body or even the inside of the jacketing tube. With heat the graphite starts to burn, generating $CO_2$ at the exposed face of the graphite layer. However, at the interface between the graphite layer and the body of swarf, CO is generated. The reason for the difference is that there is a carbon rich environment at the interface. The CO starts to form at a very early stage in the heating cycle and is believed to help prevent some of the constituents of the stainless steel such as chrome and nickel from forming oxides which once formed cannot be reduced by CO. These oxides would probably only start to form at temperatures above the temperature (700° C.) at which CO is formed from the graphite. (Stainless steels starts to scale at about 870° C.) In fact the graphite at the ends may provide an assurance against oxidation anywhere inside the system. The only way for oxidation to occur in the swarf before the generation of CO by the diffusion of carbon out of the swarf has started is for oxygen to enter the system from the two ends. Before this oxygen can get to the inner part of the system at least the bulk of it will be converted by the graphite to CO.

Of course where the tube is to be evacuated, in order to maintain the vacuum, only those methods of closing the ends providing a perfect seal will be acceptable. If a billet containing an atmosphere of nitrogen or hydrogen is to be stored for a substantial period of time it may be best also to use a closing method providing a perfect seal. In this case however, a hole will have to be formed in the ends prior to heating to allow the gas to escape as it expands.

If the tube 16a is of copper it is essential to keep the copper below its melting point. At the same time the body 12a must not be allowed to cool below the hot working temperature of the swarf. The billet may have to be heated between passes through the rolls for this purpose. Where a copper tube is used for the jacket, the sleeve 20b and end cap 20c may be of mild steel brazed on the ends of the tube.

It may be desired to use stainless steel swarf in some cases. Certain types of stainless steel (for example ASTM A304L and A316L) have specified carbon contents of 0.03% maximum. The application of graphite to the ends of the body of swarf in such cases may be particularly advantageous.

The presence of carbon may cause carbide nodules to form inside an austenitic stainless steel jacket, a process known as sensitisation. The mechanical and corrosion resistant properties of stainless steel are seriously affected by these nodules. Various measures may be taken to combat sensitisation. In the first place ferritic rather than austenitic stainless steel may be used for the jacket. Alternatively the rolled product may be heated to a temperature above 1050° C. after rolling and then quenched in water. This would keep the carbon in solution in the stainless steel.

The end pieces may be joined to the ends of the jacket in any suitable manner. They may be butt welded as shown in the drawings, for example by arc welding or friction welding. They may alternatively be pressed over or into the ends of the tube to form a seal therewith. It is of course necessary that the integrity of the seal be maintained during subsequent hot working.

In one example the jacket of a billet comprises a tube of 89 mm bore and 6 mm wall thickness. The tube is welded from ASTM A304L stainless steel plate. This tube is cut to a length of 85 cm. Open ended end pieces are used. Each end piece has the same bore and wall thickness but is welded from mild steel plate and is 75 mm long. The end pieces and the ends of the tube are chamfered and butt welded by an automatic arc welding process. By means of a single ram press described above the jacket is filled with briquettes pressed from mild steel swarf which has been cleaned and crushed into particles sieved to +3 mm giving an average size of finished shavings equal to about 7 mm. The density of the briquettes is more than about 85% of solid steel. The interfaces 24 of the briquettes may be provided with complemental interlocking protuberances and recesses to help prevent them from separating during rolling.

Various sizes of flat bars have been rolled from these billets. The thickness of the cladding is remarkably constant and depends of course on the size of the end product. For example in a 40 mm×6 mm flat bar the average thickness of the cladding is about 0.5 mm. Although in some cases there has been evidence of the formation of a limited amount of chrome oxide at the interface between the core and the cladding the bond therebetween is considered satisfactory for many applications.

Figure 6:
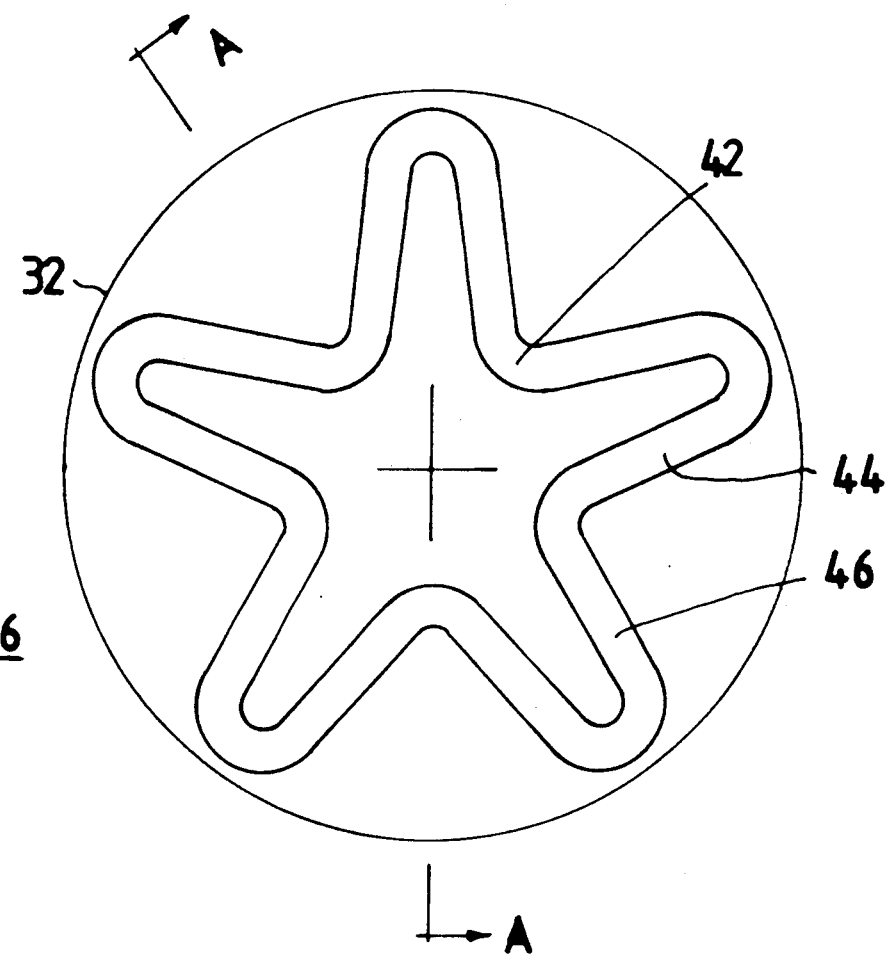
FIG. 6 is an end view of yet another modified billet.
Figure 7:
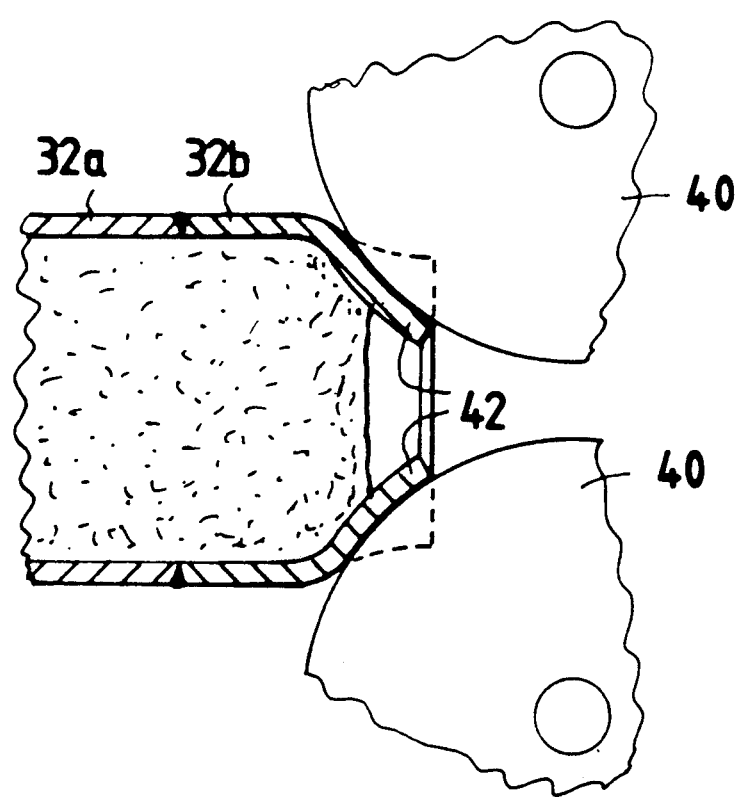
FIG. 7 is a sectional view on arrows A—A in FIG. 6.

As noted above mild steel end pieces afford easier entry for a stainless steel jacketed billet into the rolls. This is at least partly because the coefficient of friction between the rolls and the mild steel ends is greater than for stainless steel ends. Entry into the rolls can be further enhanced by tapering the ends as shown in FIGS. 6 and 7. By means of rollers 40 mounted in a die, five flutes 42 are formed in each end piece. These flutes are deepest at the extremities of the end pieces. In fact at each extremity the end piece is drawn into the shape of a five pointed star each arm of which comprises two portions 44, 46 of the tube wall folded until they are almost in contact with one another. In the case of a tube of about 100 mm diameter this process reduces the width of the extremities presented to the rolls to about 80 mm. The angle of bite for rolls of 30 cm diameter is therefore reduced from about 63° to about 58°.

In the examples described herein the billets are rolled to form finished products such as flats, sections and reinforcing rods. However similarly formed billets of the same or different size and shape may equally well be subjected to alternative hot working procedures such as extrusion or forging.

It is not intended that the scope of a patent granted in pursuance of the application of which this specification forms a part should exclude modifications and/or improvements which are within the spirit of the invention as defined in the claims appended hereto or be limited by details of the embodiments described and/or illustrated further than is necessary to distinguish the invention from the prior art.

What I claim is:

1. A billet comprising a mass of compacted swarf of engineering steel jacketed in a tubular jacket of stainless steel, wherein at least one end of the jacket is joined to an end piece of engineering steel which surrounds an end portion of the mass of swarf.

2. A billet according to claim 1, wherein said end piece is tubular.

3. A billet according to claim 1, wherein a sealing member is inserted in the end piece and overlies the said one end of the mass of swarf.

4. A rolled product produced by heating and rolling a billet according to claim 1.

5. A billet comprising a mass of compacted swarf jacketed in a tubular metal jacket, wherein at least one end of the jacket is joined to an end piece which surrounds an end portion of the mass of swarf, the end piece and the swarf being composed of materials of substantially similar composition and the jacket being composed of a material of different composition, and wherein the jacket has a substantially higher coefficient of thermal expansion than either the end piece or the swarf.

6. A billet according to claim 5, wherein said end piece is tubular.

7. A billet according to claim 5, wherein a sealing member is inserted in the end piece and overlies the said one end of the mass of swarf.

8. A rolled product produced by heating and rolling a billet according to claim 5.

* * * * *